(No Model.)

W. H. REED.
EVAPORATOR.

No. 280,514. Patented July 3, 1883.

WITNESSES:
H. W. Berger
C. Sedgwick

INVENTOR:
W. H. Reed
BY Munn & Co
ATTORNEYS.

UNITED STATES PATENT OFFICE.

WILLIAM H. REED, OF CLIFFDALE, ILLINOIS.

EVAPORATOR.

SPECIFICATION forming part of Letters Patent No. 280,514, dated July 3, 1883.

Application filed February 15, 1883. (No model.)

*To all whom it may concern:*

Be it known that I, WILLIAM H. REED, of Cliffdale, Calhoun county, Illinois, have invented a new and Improved Evaporator, of which the following is a full, clear, and exact description.

The object of the invention is to improve evaporators, as hereinafter described, and pointed out in the claim.

Reference is to be had to the accompanying drawings, forming part of this specification, in which similar letters of reference indicate corresponding parts in all the figures.

Figure 1:
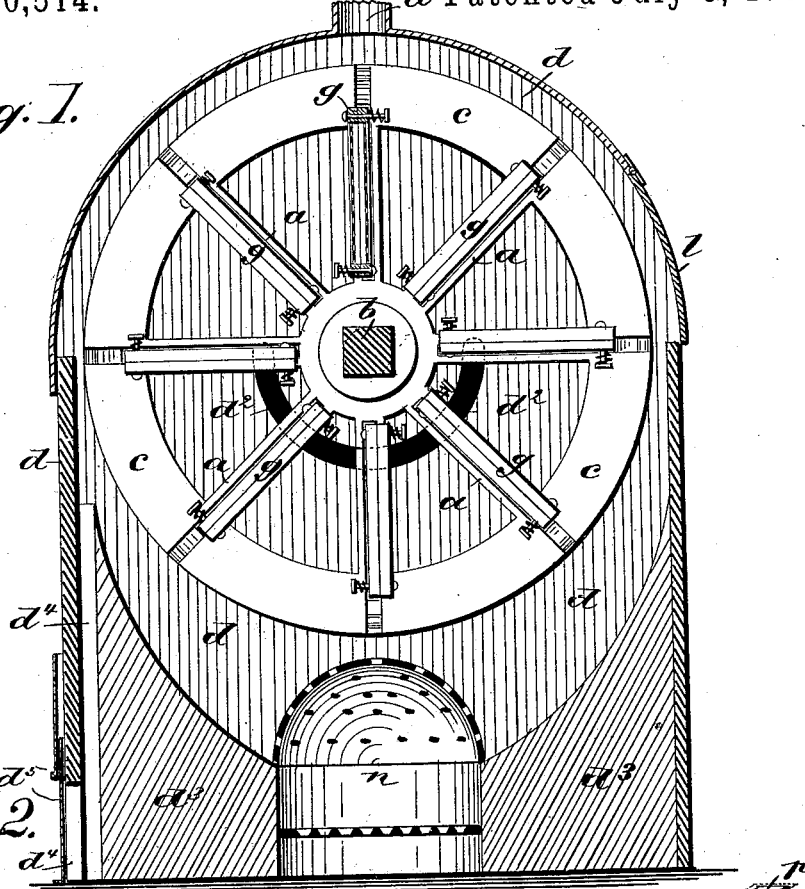
Figure 2:
Figure 3:
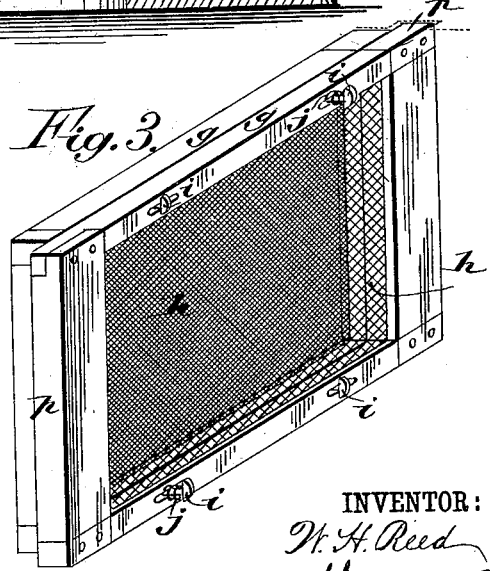

Figure 1 is a transverse sectional elevation of my improved evaporator; Fig. 2, a section in the plane of the axis of the wheel; and Fig. 3 is a perspective view of one of the fruit-crates.

I provide a reel consisting of grooved arms $a$, of a shaft, $b$, and end flanges or rims, $c$, in a heating-chamber, $d$, and in bearings $e$ for the shaft, which is to be slowly revolved by a crank, $f$, or other means. The heating-chamber $d$ is fitted with a ventilator, $d'$, at the top, and valved air-inlets $d^2$ at the sides about the shaft $b$, the bottom of the furnace at the sides being preferably filled in, as at $d^3$, by fire-resisting clay, to carry the heat of the furnace directly up to the reel without great loss by radiation, and an air-inlet or passage, $d^4$, is provided for admission of air from below and controlled by a damper-slide, $d^5$, for regulating the air supply, as required to remove the moisture from the drier by the upward current through the ventilator $d'$.

In the reel I place the fruit, vegetables, and other articles to be dried by means of crates consisting of a pair of frames, $g$, covered upon one side with wire-netting, $h$, or equivalent material, and connected together to confine the matters between the nettings by button-headed bolts $i$, with springs $j$, that connect and disconnect the frames readily, and secure them together without slack, one of the frames of the said crates being longer than the other to provide tongues $p$, to slide in the grooves of the arms, so that said crates may be shoved in their places in the reel through an opening in the chamber-wall extending the length of the reel, and having a door, $l$, for closing it. The crates are secured in the arms $a$ by spring-catches $m$ or suitable means. A suitable fire-place, $n$, or other means of heating the chamber is to be employed. By this rotary motion of the reel carrying the fruit through the air-space surrounding it, through which the air is passing upward from the side at $d^4$, and through opening $d^3$ around the shaft, and out through the ventilator at the top, the air being heated by the stove, the crates containing the fruit will be exposed in all their parts and surfaces alike, producing rapid and uniform evaporation, whereby all the contents will be evenly and effectively evaporated without shifting or handling the pans and exposure to heat as by other methods, and with less labor than the shifting of the pans by hand involves.

The capacity of the machine may be increased at will by extending the shaft and adding sections to the reel, and the sections may be geared so that any one may be stopped or operated without the others.

Having thus described my invention, I claim as new and desire to secure by Letters Patent—

The combination, with an evaporator-reel having the grooved arms $a$ and the catches $m$, of the crates $g\ g$, each formed of two frames, of which one is made longer than the other to form a tongue to work in the groove of an arm, $a$, as shown and described.

WILLIAM HUNTER REED.

Witnesses:
JOHN S. GOURLEY,
J. R. C. COVINGTON.